United States Patent
Saxena et al.

(10) Patent No.: US 7,882,170 B1
(45) Date of Patent: Feb. 1, 2011

(54) INTERFACING A FIRST TYPE OF SOFTWARE APPLICATION TO INFORMATION CONFIGURED FOR USE BY A SECOND TYPE OF SOFTWARE APPLICATION

(75) Inventors: Parichay Saxena, Bellevue, WA (US); Todd Abel, Redmond, WA (US); Ricard Roma i Dalfó, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1426 days.

(21) Appl. No.: 11/143,086

(22) Filed: Jun. 1, 2005

Related U.S. Application Data

(60) Provisional application No. 60/616,699, filed on Oct. 6, 2004.

(51) Int. Cl.
*G06F 15/16* (2006.01)
(52) U.S. Cl. .................. 709/203; 709/218; 709/219; 707/793; 707/608; 707/912
(58) Field of Classification Search ............... 709/203, 709/218, 219; 707/100, 101; 370/401
See application file for complete search history.

(56) References Cited

U.S. PATENT DOCUMENTS

| | | | | |
|---|---|---|---|---|
| 5,832,481 | A * | 11/1998 | Sheffield | 707/4 |
| 5,892,905 | A * | 4/1999 | Brandt et al. | 726/11 |
| 6,047,312 | A * | 4/2000 | Brooks et al. | 709/203 |
| 6,810,429 | B1 * | 10/2004 | Walsh et al. | 709/246 |
| 7,139,766 | B2 * | 11/2006 | Thomson et al. | 707/101 |
| 7,275,079 | B2 * | 9/2007 | Brodsky et al. | 709/203 |
| 2002/0095605 | A1 * | 7/2002 | Royer et al. | 713/201 |
| 2003/0074393 | A1 * | 4/2003 | Peart | 709/203 |
| 2003/0145315 | A1 * | 7/2003 | Aro et al. | 717/170 |
| 2003/0233365 | A1 * | 12/2003 | Schmit et al. | 707/100 |
| 2004/0004952 | A1 * | 1/2004 | McGrath et al. | 370/338 |
| 2004/0019602 | A1 * | 1/2004 | Williams et al. | 707/102 |
| 2004/0044680 | A1 * | 3/2004 | Thorpe et al. | 707/102 |
| 2004/0205075 | A1 * | 10/2004 | LaTurner et al. | 707/100 |
| 2005/0050057 | A1 | 3/2005 | Mital et al. | |
| 2005/0050199 | A1 | 3/2005 | Mital et al. | |
| 2006/0059556 | A1 * | 3/2006 | Royer | 726/22 |
| 2006/0074953 | A1 * | 4/2006 | Dettinger et al. | 707/101 |
| 2006/0161973 | A1 * | 7/2006 | Royer et al. | 726/8 |
| 2006/0168347 | A1 * | 7/2006 | Martin | 709/246 |

* cited by examiner

*Primary Examiner*—Jeffrey F Harold
*Assistant Examiner*—Khaled Kassim
(74) *Attorney, Agent, or Firm*—Wolf, Greenfield & Sacks, P.C.

(57) ABSTRACT

Systems and methods for enabling a host application and uses thereof access to otherwise inaccessible information configured solely for use by other types of applications. The information may be exposed for use by the host application as information elements (e.g., metadata). During execution the host application may dynamically access these information elements using references specifying the information elements. These references may be used to retrieve pieces of information for display and/or modification by users. The content provided by the application may have an associated smart tag or uniform resource locater that specifies the reference. Further, for particular content, references may be generated from a structural abstraction representing the structure of the content. The structural abstraction may have one or more nodes corresponding to one or more respective sections of the content. A mapping table may be applied to map nodes of the structural abstraction to references that specify exposed information.

14 Claims, 8 Drawing Sheets

| Content ID | | |
|---|---|---|
| Application Type | Screen ID | Reference Transform |
| PeopleSoft | 5 | [XSLT Code] |
| PeopleSoft | 10 | [XSLT Code] |
| ⋮ | | |
| SAP | 24 | [XSLT Code] |
| SAP | 30 | [XSLT Code] |
| ⋮ | | |
| Siebel | 3 | [XSLT Code] |
| ⋮ | | |

FIG. 7

INTERFACING A FIRST TYPE OF SOFTWARE APPLICATION TO INFORMATION CONFIGURED FOR USE BY A SECOND TYPE OF SOFTWARE APPLICATION

RELATED APPLICATIONS

This application claims priority under 35 U.S.C. §119(e) to U.S. Provisional Application Ser. No. 60/616,699, titled "Extending IBF to Desktop Applications," filed on Oct. 6, 2004, which is hereby incorporated by reference in its entirety.

BACKGROUND

In today's business world, workers often use several different types of software applications to process different types of applications. For example, a worker may use several different types of applications for billing, inventory management, customer relations management, docketing, and several different type of applications for processing information generally, for example, email applications, calendar applications, word processing applications, spreadsheet applications, browser applications, database applications, presentation applications, etc.

Unfortunately, the information processed by these applications is often configured (i.e., formatted or arranged) to be used with only certain types of applications, such that the information is not accessible to other types of applications. For example, the data used by one line-of-business (LOB) application such as an PeopleSoft application typically is not be configured for use by other LOB applications such as an SAP application or by a more general purpose application such as Microsoft® Outlook®. Consequently, a user must bounce back and forth between applications to utilize the information provided by both applications, which is an inefficient use of the user's time. These inefficiencies are exacerbated when such information is shared between multiple users.

SUMMARY

Disclosed herein are systems and methods for enabling a host application and users thereof access to otherwise inaccessible information configured solely for use by other types of applications. The information may be exposed for use by the host application as information elements (e.g., metadata). During execution, the host application may dynamically access these information elements using references specifying the information elements. These references may be used to retrieve pieces of information for display and/or modification by users.

The content provided by the application may have an associated smart tag or uniform resource locator that specifies the reference (e.g., XML schema or object). Further, for particular content, references may be generated from a structural abstraction representing the structure of the content. The structural abstraction may have one or more nodes corresponding to one or more respective sections of the content. A mapping table may be applied to map nodes of the structural abstraction to references that specify exposed information.

In an embodiment of the invention, a user is enabled to access, during and in response to execution of a first software application of a first type, information configured for use by a second type of software application different than the first type. A plurality of information elements are stored in one or more data sources, the information elements exposing the information for use by applications of at least the first type. The first application is executed, including displaying content having at least one section and monitoring a structural abstraction associated with the content. The structural abstraction represents a structure of the content and defines at least one node corresponding to the at least one section of the content. In response to a user action involving the at least one section of the content, a reference is generated specifying at least one of the plurality of information elements stored in the one or more data sources. Generating includes mapping the at least one node of the structural abstraction to the reference. One or more pieces of the exposed information are retrieved based on the at least one information element specified by the reference.

In an aspect of this embodiment, the one or more data sources store at least one mapping table for mapping nodes of the structural abstractions to references specifying information elements. generating the reference includes applying the at least one mapping table to map the at least one node of the structural abstraction to the at least one information element.

In another aspect of this embodiment, at least one of the one or more pieces of information is displayed to the user.

In another aspect of this embodiment, the one or more data sources include an originating data source storing the information configured for use by the second type of software application, from which the plurality of information elements are derived. The user modifies the at least one of the one or more pieces of the exposed information, and in response, a corresponding at least one piece of information in the originating data source is modified.

In yet another aspect of this embodiment, the plurality of information elements and the reference are defined in accordance with a version of Information Bridge Framework available from Microsoft Corporation.

In another aspect of this embodiment, the first application is not part of a Microsoft® Office suite of applications.

In another aspect of this embodiment, generating the reference includes generating the reference to include content of the at least one section and context information based on the at least one node.

In another embodiment of the invention, a computer program product is provided. The product includes a computer-readable medium, and computer-readable signals stored on the computer-readable medium defining instructions that, as a result of being executed by a computer, instruct the computer to perform the method of the embodiment of the invention described in the preceding paragraphs and/or one or more aspects thereof described in the preceding paragraphs.

In another embodiment of the invention, a system is provided for enabling a user to access, during and in response to execution of a first software application of a first type, information configured for use by a second type of software application different than the first type. A plurality of information elements are stored in one or more data sources, the information elements exposing the information for use by applications of at least the first type, the system includes the first software application to display content including at least one section, and to monitor a structural abstraction associated with the content. The structural abstraction represents a structure of the content and defining at least one node corresponding to the at least one section of the content. The system also includes a reference generator to control, in response to a user action involving the at least one section of the content, a generation of a reference specifying at least one of the plurality of information elements stored in the one or more data sources. The reference generator is operative to map the at least one node of the structural abstraction to the reference. The system further includes an information exchange controller to control a retrieval of one or more pieces of the exposed information based on the at least one information element specified by the reference.

In an aspect of this embodiment, the one or more data sources store at least one mapping table for mapping nodes of the structural abstraction to references specifying information elements. The reference generator is operative to control an applying of the at least one mapping table to map the at least one node of the structural abstraction to the at least one information element.

In another aspect of this embodiment, the system further includes a user interface module to control a display of at least one of the one or more pieces of information to the user.

In another aspect of this embodiment, the one or more data sources include an originating data source storing the information configured for use by the second type of software application, from which the plurality of information elements are derived. The user interface module is operative to enable the user to modify the at least one piece of the exposed information. Further, the information exchange engine is operative to at least initiate, in response to the user modification, a modification of a corresponding at least one piece of information in the originating data source.

In yet another aspect of this embodiment, the plurality of information elements and the reference are defined in accordance with a version of Information Bridge Framework available from Microsoft Corporation.

In another aspect of this embodiment, the first application is not part of a Microsoft® Office suite of applications.

In another aspect of this embodiment, the reference generator is operative to generate the reference to include content of the at least one section and context information based on the at least one node.

In another embodiment of the invention, a user is enabled to access, during and in response to execution of a first software application of a first type, information configured for use by a second type of software application different than the first type. A plurality of information elements are stored in one or more data sources, the information elements exposing the information for use by applications of at least the first type. The first application is executed, including displaying content including at least one section having an associated uniform resource locator specifying a reference to at least one of the plurality of information elements. In response to a user action involving the at least one section of the content, the uniform resource locator is interpreted to identify the reference. One or more pieces of the exposed information are retrieved based on the at least one information element specified by the reference.

In an aspect of this embodiment, at least one of the one or more pieces of information is displayed to the user.

In another aspect of this embodiment, the one or more data sources include an originating data source storing the information configured for use by the second type of software application, from which the plurality of information elements are derived. The user modifies the at least one piece of the exposed information. In response to the user modification, a corresponding at least one piece of information is modified in the originating data source.

In another aspect of this embodiment, the plurality of information elements and the reference are defined in accordance with a version of Information Bridge Framework available from Microsoft Corporation.

In another aspect of this embodiment, the first application is not part of a Microsoft® Office suite of applications.

In yet another aspect of this embodiment, interpreting the reference includes generating the reference to include content of the at least one section and context information based on the at least one node.

In another embodiment of the invention, a computer program product is provided. The product includes a computer-readable medium, and computer-readable signals stored on the computer-readable medium defining instructions that, as a result of being executed by a computer, instruct the computer to perform the method of the embodiment of the invention described in the preceding paragraphs and/or one or more aspects thereof described in the preceding paragraphs.

In another embodiment of the invention, a system id provided for enabling a user to access, during and in response to execution of a first software application of a first type, information configured for use by a second type of software application different than the first type. A plurality of information elements are stored in one or more data sources, the information elements exposing the information for use by applications of at least the first type. The system includes the first application to display content including at least one section having an associated uniform resource locator specifying a reference to at least one of the plurality of information elements. The system includes a uniform resource locator recognizer to identify, in response to a user action involving the at least one section of the content, the reference by interpreting the uniform resource locator. The system also includes an information exchange controller to control a retrieval of one or more pieces of the exposed information based on the at least one information element specified by the reference.

In an aspect of this embodiment, the system further includes a user interface module to display at least one of the one or more pieces of information to the user.

In another aspect of this embodiment, the one or more data sources include an originating data source storing the information configured for use by the second type of software application, from which the plurality of information elements are derived. The user interface module is operative to enable the user to modify the at least one of the exposed information. Further, the information exchange controller is operative to control, in response to the user modification, a modifying of a corresponding at least one piece of information in the originating data source.

In another aspect of this embodiment, the plurality of information elements and the reference are defined in accordance with a version of Information Bridge Framework available from Microsoft Corporation.

In yet another aspect of this embodiment, the first application is not part of a Microsoft® Office suite of applications.

In another aspect of this embodiment, the reference generating module is operative to generate the reference to include content of the at least one section and context information based on the at least one node.

Other advantages, novel features, and objects of the invention, and aspects and embodiments thereof, will become apparent from the following detailed description of the invention, including aspects and embodiments thereof, when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

FIG. 7 is a block diagram illustrating an example of a mapping table for mapping content to a reference specifying one or more information elements, in accordance with some embodiments of the invention;

DETAILED DESCRIPTION

Embodiments of the invention may be implemented using a version of the Information Bridge Framework (IBF) available from Microsoft® Corporation of Redmond, Wash. IBF is described at the Microsoft® Office Development Center at: http\\msdn.microsoft.com/office/understanding/ibfframework/default.apx (the IBF website), the entire contents of which on the date of filing of this application are hereby incorporated by reference. Further, the entire contents of Appendix I: Microsoft Office Information Bridge Framework Technical White Paper which describes a version of IBF suitable for Microsoft® Office applications, is hereby incorporated by reference. Although several embodiments described herein are described primarily in relation to IBF, it should be appreciated that the invention is not so limited. Embodiments of the invention may be implemented using any of a variety of other technologies, which are intended fall within the scope of the invention.

The function and advantage of these and other embodiments of the present invention will be more fully understood from the examples described below. The following examples are intended to facilitate a better understanding and illustrate the benefits of the present invention, but do not exemplify the full scope of the invention.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Eighth Edition, Revision 2, May 2004), Section 2111.03.

EXAMPLES

Figure 1:
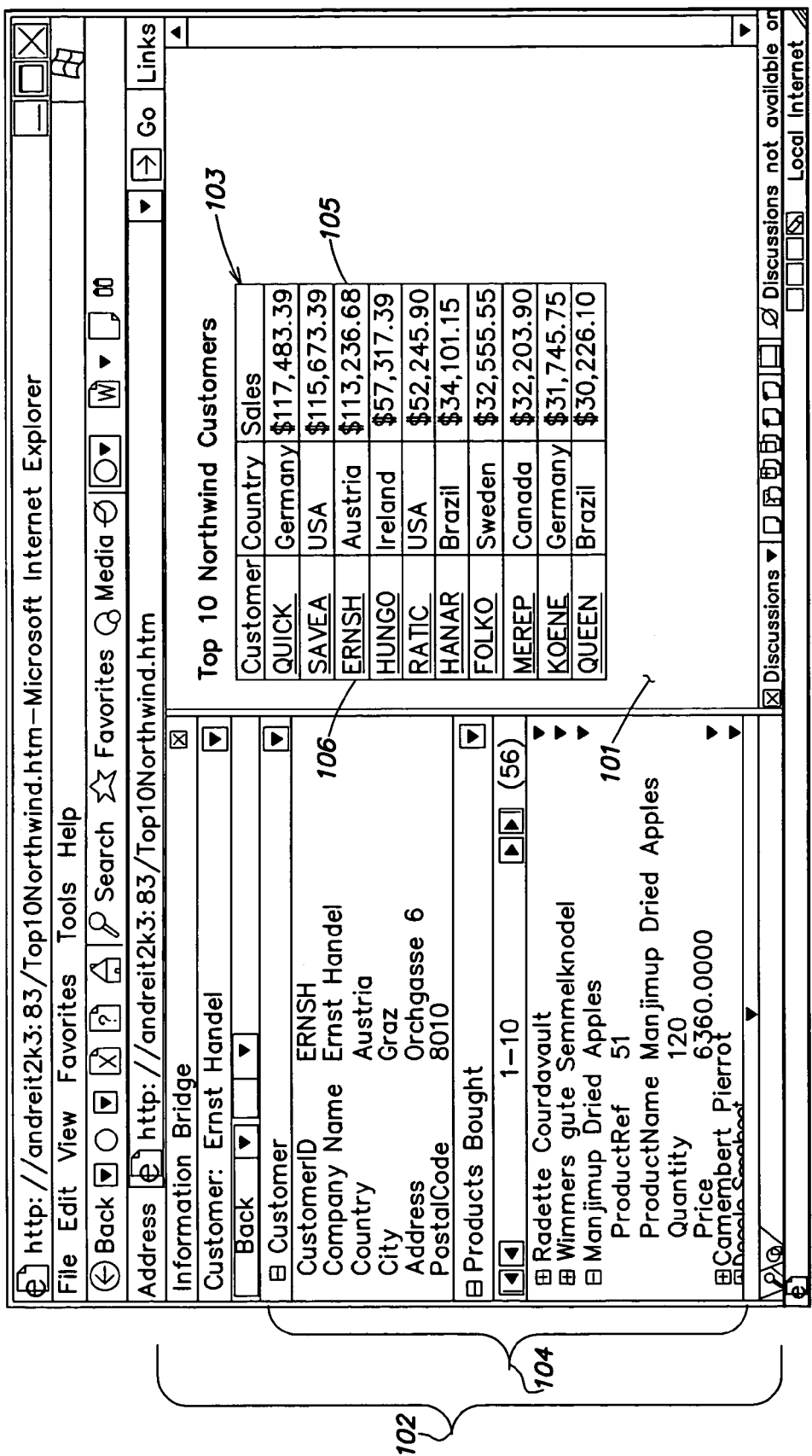
FIG. 1 is a screen shot illustrating an example of the user interface display of a first type of software application, the user interface displays displaying and/or enabling a user to modify information configured for use by a second type of software application, according to some embodiments of the invention.

FIG. 1 is a screen shot illustrating an example of the user interface display 100 of a first type of software application displaying and/or enabling a user to modify information configured for use by a second type of software application, according to some embodiments of the invention. Display 100 is merely an illustrative embodiment of a user interface display of a first type of software application displaying and/or enabling a user to modify information configured for use by a second type of software application, and is not intended to limit the scope of the invention. Display 100 provides context for the remainder of the detailed description section of this application, but any of numerous other implementations of such a display, for example, variations of display 100 are possible and are intended to fall within the scope of the invention.

As used herein, a "user interface" is an application or part of an application (i.e., a set of computer-readable instructions) that enables a user to interface with an application during execution of the application. A user interface may include code defining how an application outputs information to a user during execution of the application, for example, visually through a computer screen or other means, audibly through a speaker of other means, and manually through a game controller or other means. Such user interface also may include code defining how a user may input information during execution of the application, for example, audibly using a microphone or manually using a keyboard, mouse, game controller, track ball, touch screen or other means.

The user interface may define how information is visually presented (i.e., displayed) to the user, and defines how the user can navigate the visual presentation (i.e., display) of information and input information in the context of the visual presentation. During execution of the application, the user interface may control the visual presentation of information and enable the user to navigate the visual presentation and enter information in the context of the visual presentation. Types of user interfaces range from command-driven interfaces, where users type commands, menu-driven interfaces, where users select information from menus, and combinations thereof, to GUIs, which typically take more advantage of a computer's graphics capabilities, are more flexible, intuitive and easy to navigate and have a more appealing "look-and-feel" than command-driven and menu-driven visual user interfaces. As used herein, the visual presentation of information presented by a user interface or GUI is referred to as a "user interface display" or a "GUI display", respectively.

Display 100 may be implemented using a browser application (e.g., Microsoft® Internet Explorer), and may include any of: browser display 101 and bridged information display 102. As used herein, "bridged information" is information, configured for use with one type of application, that is accessed by another type of application. Such bridged information may be displayed to a user of the other type of application and/or may be modified by the user using the other type of application.

Browser display 101 may display information configured for use by the browser application. For example, in FIG. 1, browser display 101 displays a customer table 103 including a plurality of entries, each entry including a customer name, a country of the customer and the sales to the customer. Table 103 and information displayed therein are generated by the browser application and/or by a user executing the browser application. One or more pieces of information included in Table 103 may have an associated reference to information configured for use by another type of application. As will be described in more detail below, these references may have been generated manually by a user, automatically (e.g., using one or more components of system 100 or 200) or by other means.

In response to a user action involving one of these pieces of information (e.g., "clicking" a mouse on the piece of information, hovering a mouse pointer over a piece of information, editing a piece of information, navigating to a piece of information, etc.), related information configured for use by another type of application may be accessed. This related information may be accessed using the reference, and may be displayed in bridged information display 102. For example, in response to a user event associated with the customer listed in field 106 of table 103, bridged information 104 relating to the customer may be displayed in bridged information display 102. The user then may be enabled to navigate and/or modify the bridged information.

Systems and methods for providing access, from within a first type of software application, to information configured for use by a second type of software application, will now be described.

Figure 2:
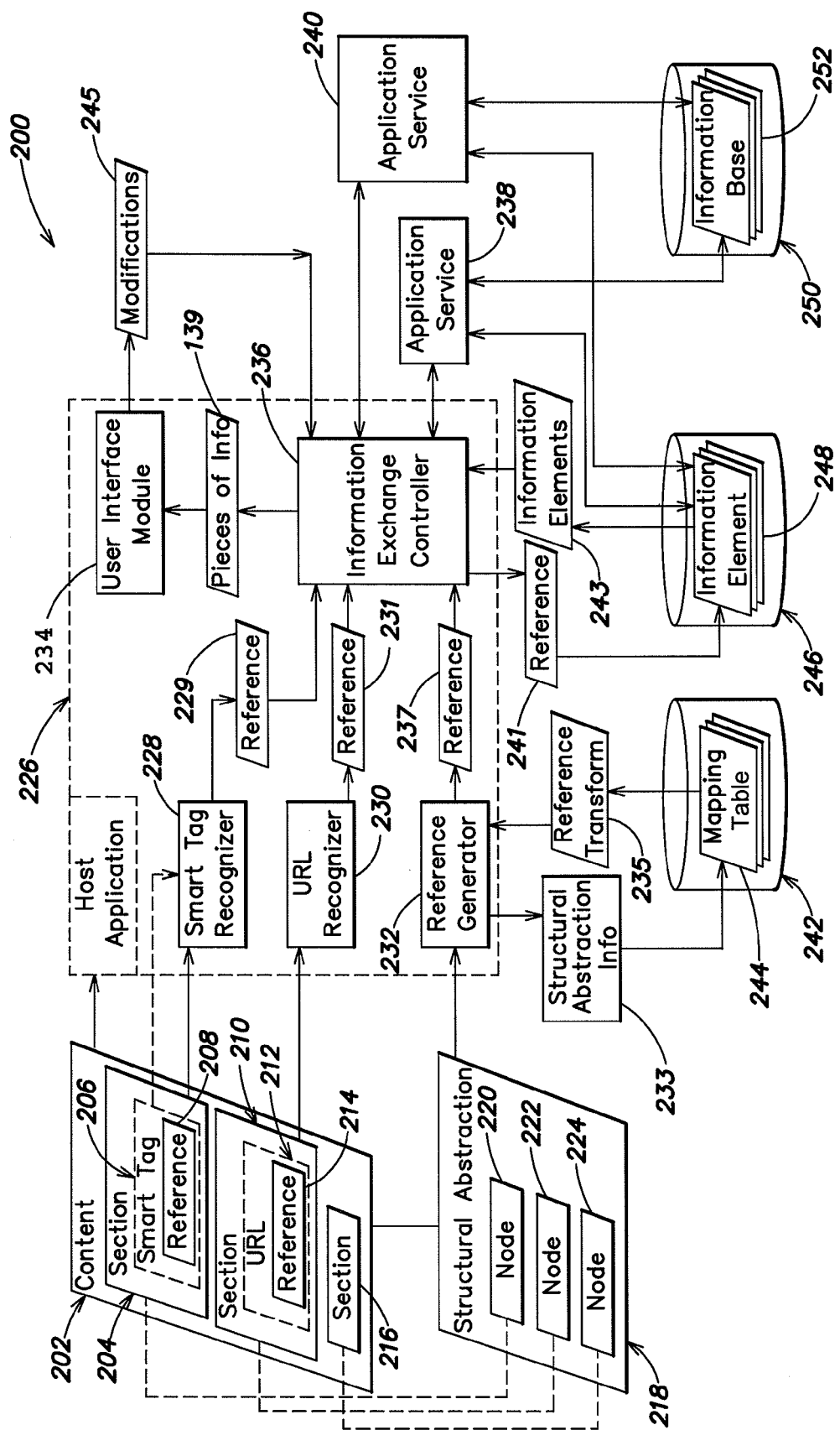
FIG. 2 is a block diagram illustrating an example of a system for providing access, from within a first type of software application, to information configured for use by a second type of software application, according to some embodiments of the invention.

FIG. 2 is a block diagram illustrating an example of a system 200 for providing access, from within a first type of software application, to information configured for use by a second type of software application, according to some embodiments of the invention. System 200 is merely an illustrative embodiment of a system for interfacing a first type of software application to information configured for use by a second type of software application, and is not intended to limit the scope of the invention. Any of numerous other implementations of such a system, for example, variations of system 200 are possible and are intended to fall within the scope of the invention. For example, such a system may be implemented as described below in relation to FIG. 3.

Figure 3:
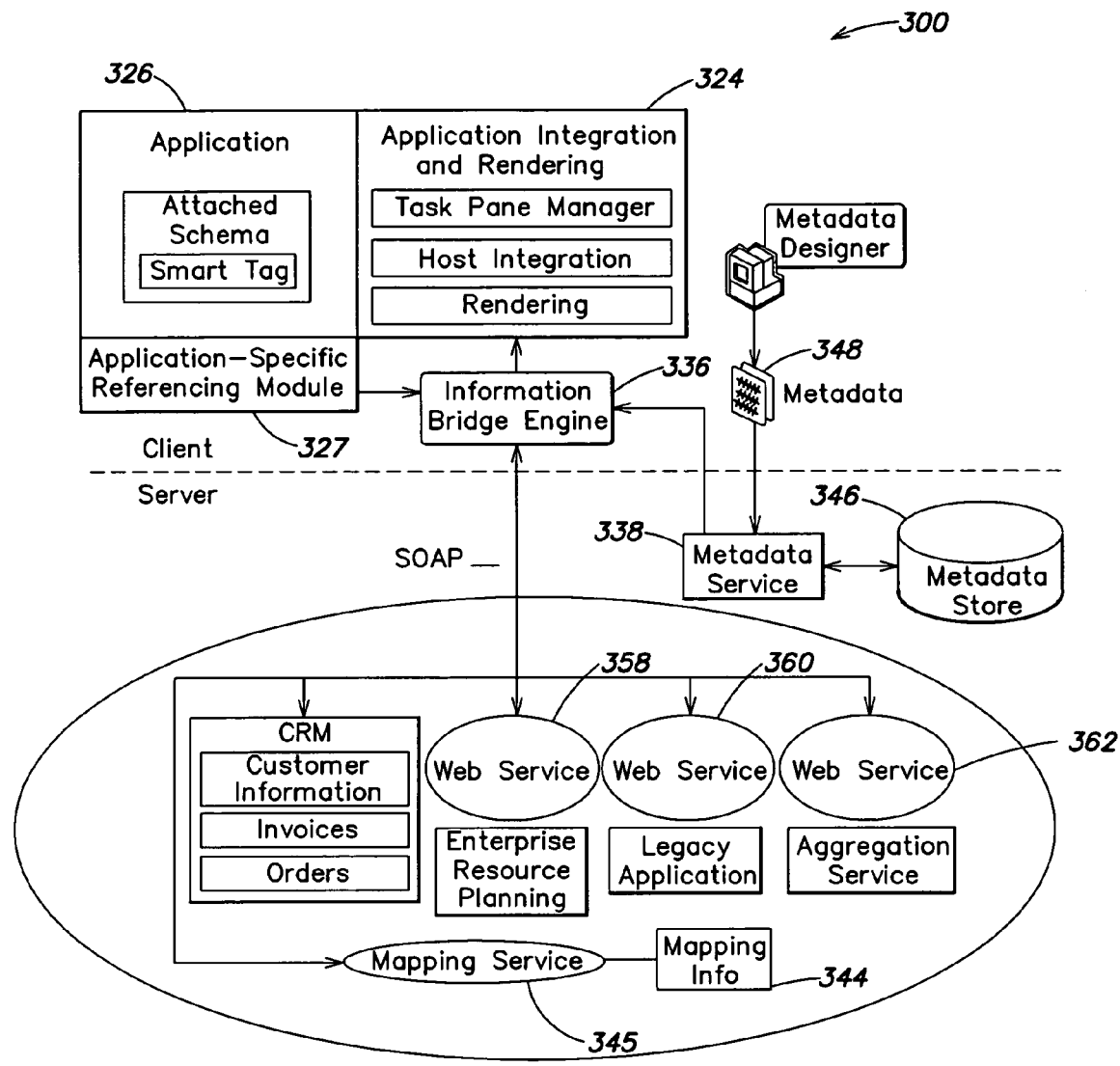
FIG. 3 is a block diagram illustrating an example of a system for providing access from within a first type of software application, to information configured for use by a second type of software application using a version of IBF, according to some embodiments of the invention.

Throughout the description of system 200 and other embodiments of the invention, reference will be made to system 300 of FIG. 3. FIG. 3 is a block diagram illustrating an example of a system 300 for providing access, from within a first type of software application, to information configured for use by a second type of software application using a version of IBF, according to some embodiments of the invention. Various components of system 300 may be implemented as described on the IBF website and/or in Appendix I.

System 200 may include any of: host application 226; smart tag recognizer 228; Uniform Resource Locator (URL) recognizer 230; reference generator 232; user interface module 234; information exchange controller 236; one or more application services (e.g., services 238 and 240); one or more data sources 242, 246 and 250; other components; or any suitable combination of the foregoing.

Data source 250 may include one or more information bases (e.g., data base) 252 configured for use by one or more types of applications, for example, any of the types of applications described below in relation to host application 226. An information base 252 may be configured to be compatible with only specific types of applications such that the information therein is not readily accessible by other types of applications. For example, an information base 252 may be configured for use only with a particular type of LOB application such as, for example, SAP, Siebel or PeopleSoft, or another type of application. To enable other types of applications access to the information in the information bases, the information may be exposed (e.g., by one or more application services 238, 240) as one or more information elements 248 stored in a same or different data source from the information base 252 (e.g., in data source 246). For example, application service 238, information elements 248 and data source 246 may be implemented as metadata service 338, metadata 348, and metadata store 346 of system 300, respectively, for example, as described on the IBF website and/or in Appendix I. Each information element 248 may have a standardized format, so that any of a variety of types of applications can be configured to access the information elements, for example, as described on the IBF website and/or in Appendix I.

One or more mapping tables 244 may be provided in a same or different data source (e.g., data source 242) as the data sources that provided the information bases 252 and information elements 248. As will be described in more detail below, mapping table 244 may be configured with a plurality of entries, each entry specifying respective structural abstraction information and a transformation that can be used to produce a reference to one or more information elements. In some embodiments, mapping table 244 may be implemented as part of mapping information 344 of system 300, which may be serviced by mapping service 345, as is described below in more detail.

Host application 226 may include one or more of components 228, 230, 232, 234 and 236 and/or may be configured to communicate with one or more of such components. For example, as described below in more detail, one or more of components 228, 230, 232, 234 and 236 may be implemented in accordance with a version of IBF available from Microsoft Corporation. Host application 226 may be implemented as application 326 of system 300, for example, as described on the IBF website and/or in Appendix I.

Host application 226 may be any of a variety of types of applications, including, but not limited to any of a: word-processing application (e.g., Microsoft® Word), spreadsheet application (e.g., Microsoft® Excel™), database application (e.g., Microsoft® Access), presentation application (e.g., PowerPoint®), publishing application (e.g., Microsoft® Publisher), photo viewing and/or editing application, content viewing application (e.g., Adobe® Reader®), email application, calendar application, task management application, web browser application (e.g., Microsoft® Internet Explorer), Line of Business (LOB) application (e.g., SAP, Siebel, PeopleSoft, etc.), other type of application, and any suitable combination of the foregoing (e.g., Microsoft® Outlook®).

Host application 226 may be configured to display content to a user such as, for example, content 202, and may be configured to enable the user to edit the content. Content 202 may be any of a plurality of types of content from any of a variety of sources. For example, content 202 may be any of: content of a document supported by host application 226; content of a template, form or screen provided by the application; content drawn from a database; constant content; variable content; user-editable content; other types of content; or any suitable combination of the foregoing. Content 202 may include one or more sections such as, for example, sections 204, 210 and 216. Content 202 may be configured according to one or more technologies that host application 226 may apply to enable users to access information configured for use by an application of a type different than host application 226. For example, content 202 may have one or more smart tags 206, each smart tag affiliated with a particular section (e.g., section 204) of the content and specifying a reference (e.g., 208) to one or more information elements 248.

Figure 4:
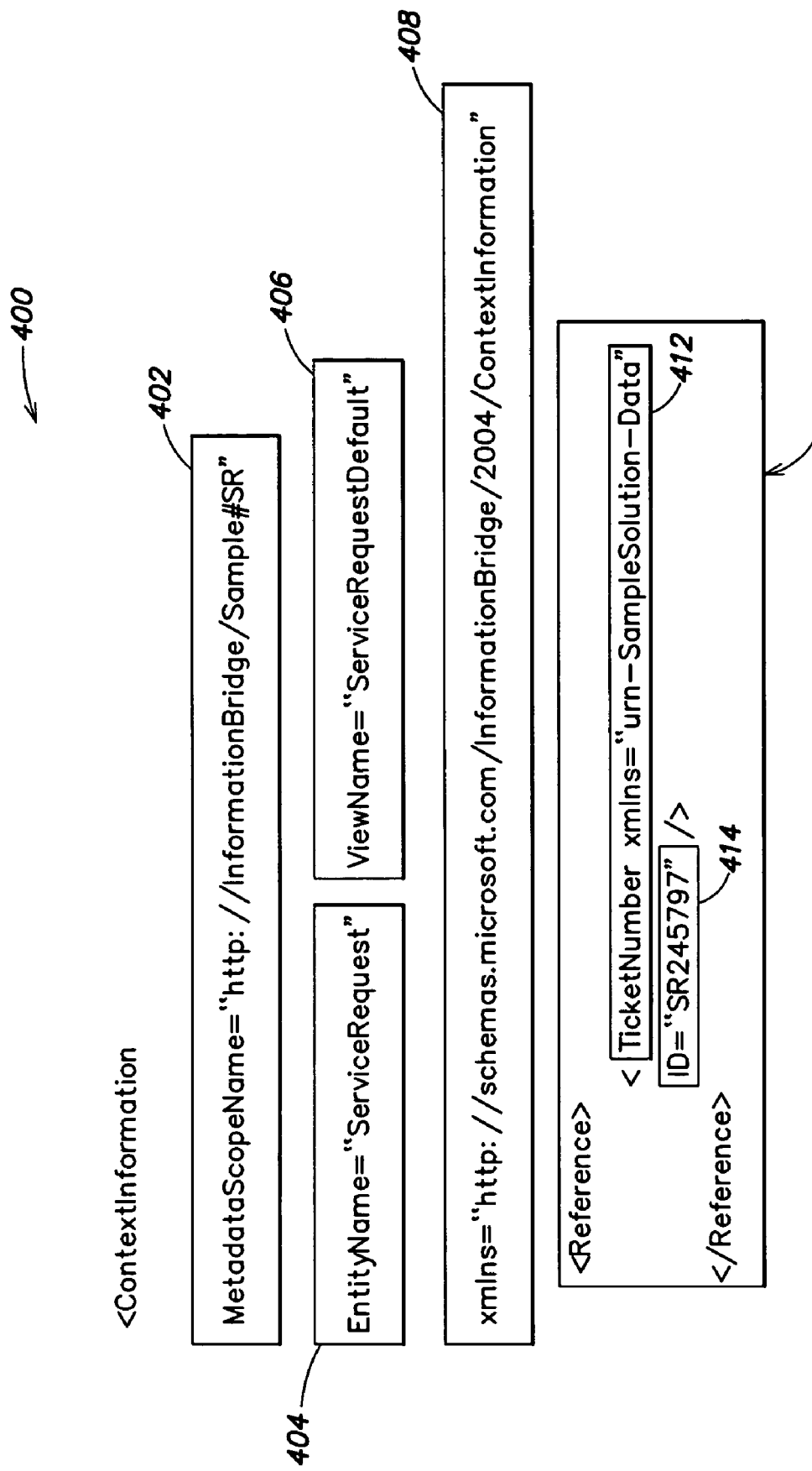
FIG. 4 is a block diagram illustrating an example of a reference used by a first type of software application to access information configured for use by a second type of software application, according to some embodiments of the invention.

Digressing briefly from FIG. 2, FIG. 4 is a block diagram illustrating an example of a reference 400 to be used by a first type of software application to access information configured for use by a second type of software application, according to some embodiments of the invention. Reference 400 is merely an illustrative embodiment of such a reference, for example, which may be used in an embodiment of the invention implemented using IBF. Any of numerous other implementations of such a reference, for example, variations of reference 400 are possible and are intended to fall within the scope of the invention. For example, although reference 400 is formatted in accordance with XML, the invention is not so limited, as a reference may be formatted in accordance with any of a variety of technologies. Regardless of the implementation or technology used, the reference should be configured to uniquely identify a piece of information configured for use by a particular application.

Reference 400 may include any of: name field 402; entity field 404; view field 406; format field 408; specific reference field 410; other components; or any suitable combination of the foregoing. Specific reference field 410 may include specific reference format field 412 and reference ID field 414.

In some embodiments, the combination of fields 402, 404, 406 and 414 uniquely identify an information element, whereas fields 408 and 412 specify formats (e.g., a schema) according to which reference 400 is arranged. The scope field 402 may specify a value that may be considered a sort of namespace for the reference. That is, the value specified in scope field 402 narrows the scope of the available information elements to a particular subset of information elements, in this case, the information elements belonging to scope "http://InformationBridge/Sample#SR".

The entity field 404 specifies a particular type of information item within the subset of information items of the scope specified in field 402. For example, the specific type of information element may be a "ServiceRequest" as shown in FIG. 4. A type of entity may include one or more information units and may specify one or more functions that may be applied to these one or more information units. For example, a ServiceRequest may include (among other information units) a creation date, a description, a priority and a resolution date, and may include functions (among other functions) for creating and/or modifying values for any of these information units.

It may be desirable that certain users or groups of users only have access to particular information units and functions defined for a particular entity type. Further, it may be desirable that only certain information units and functions are available under certain contexts. For example, it may be desirable that certain types of applications and/or content, or components thereof, have access to certain information units and functions of an information element, whereas other types of applications and/or content, or components thereof, have access to other certain information units and functions of an information element. Accordingly, view field 406 may specify a particular "view" of the information element identified by the entity field 404. That is, the view field 406 may specify the information units and functions (i.e., operations) of an information element that are to be retrieved in response to execution of the reference. For example, a particular view of ServiceRequest may specify all of the information units described above, but only functions for creating and/or modifying the description.

Reference ID field 414 may specify a specific information element (e.g., an instance of an information element type) being retrieved. For example, ServiceRequest may be a particular type of information element, whereas SR 245797, specified in field 414, may be an actual service request.

Format field 408 may specify a format in accordance with which reference 400 is formatted. For example, in FIG. 4, field 408 specifies a particular schema provided by IBF. Similarly, specific reference format field 412 may specify a particular format of the specific reference 410. For example, in FIG. 4, field 412 specifies a particular schema defined by IBF. It should be appreciated that other types of formats may be specified.

Returning to FIG. 2, a reference such as reference 400 may be included as part of a smart tag (e.g., 206) of a section (e.g., 204) of content 202. The use of smart tags in this fashion may be desirable for certain embodiments such as, for example, if content 202 is a document and host application 226 is configured to make use of smart tags. For example, any of a variety of applications available from Microsoft Corporation (e.g., any such applications disclosed herein)

In some embodiments, it may be desirable to use a technology other than smart tag technology to associate a reference with content. For example, content 202 may include one or more sections (e.g., section 210) that have an associated uniform resource located (URL) 212 including a reference 214. Such a URL may have a unique format recognized by one or more elements of system 200 such as, for example, URL recognizer 230, which will be described in more detail below. URL 212 may have any of a variety of formats that distinguish it from other know URL formats. For example, common URL formats include "http://[network location identifier]", "ftp://[network location identifier]; https://[network location identifier]", etc. In each of these examples the first portion of the URL (e.g., "http", "ftp", "https") may be referred to as a "scheme" of the URL. In some embodiments of the invention, to distinguish URL 212 from other known URLs, the URL scheme may be unique such as, for example, "IBF". The remaining portion of the URL 212 may include the reference to one or more information elements. Accordingly, in some embodiments of the invention, URL 212 may have the following format: "IBF://[reference]".

The reference 212 itself may have any of a variety of formats, such as, for example, the format of reference 400 described above in relation to FIG. 4. Such a URL may be desirable for embodiments of the invention where the host application 226 can be configured to utilize URL technology, for example, when host application is a web browser or an Instant Messaging (IM) application. For example, one or more of the fields of table 103 described above in relation to FIG. 1 may have an associated URL that includes a reference. For example, field 106 may have an embedded URL including a reference to information elements that specify the bridged information 104.

In some embodiments of the invention, it may be desirable to use a technology other than smart tags and URLs to interface a first type of software application to information configured for use by a second type of software application. For example, content 202 may have an attached structural abstraction 218 that includes one or more nodes (e.g., nodes 220, 222 and 224 corresponding to sections of content 202 (e.g., sections 204, 210 and 216, respectively). Structural abstraction 218 may represent a structure of content 202, and each node may be configured in a format suitable for being mapped to a reference to one or more information elements 248, for example, by reference generator 232. The use of a structural abstraction 218 associated with content 202 will now be described in more detail in relation to FIGS. 5-7.

Figure 5:
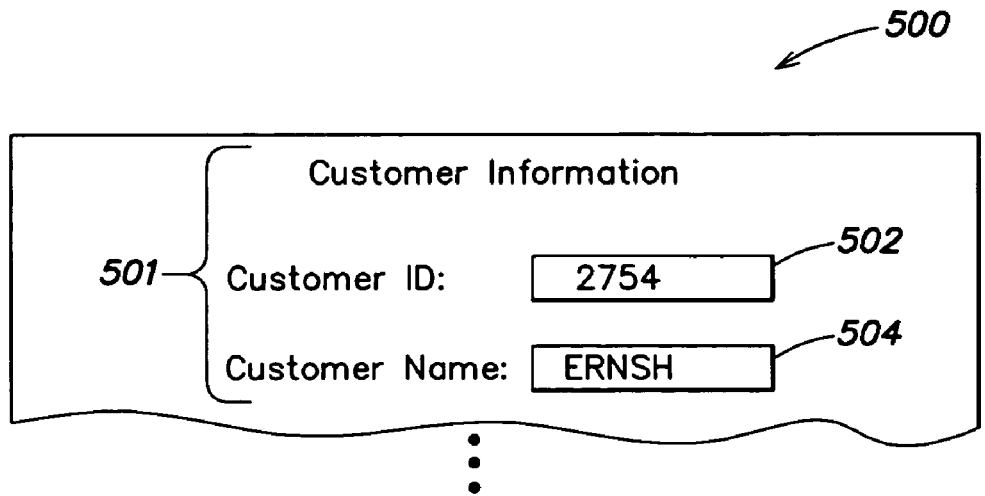
FIG. 5 is a diagram illustrating an example of content displayed as part of a user interface display of a software application, according to some embodiments of the invention.

FIG. 5 is a diagram illustrating an example of a user interface display 500 of a software application displaying content 501, according to some embodiments of the invention. The software application may be any of a plurality of types of applications, for example, any of these described above. The content 501 may include a screen having one or more fields including customer ID field 502 and customer name field 504.

Figure 6:
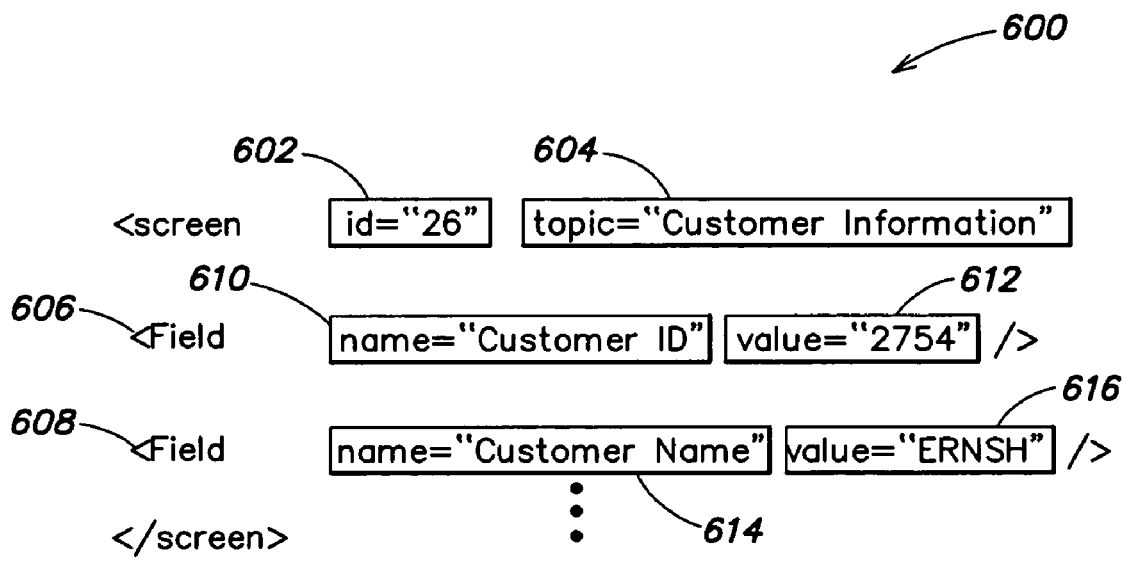
FIG. 6 is a diagram illustrating an example of a structural abstraction representing a structure of a document, according to some embodiments of the invention.

FIG. 6 is a diagram illustrating an example of a structural abstraction representing a structure of the content displayed in display 500, according to some embodiments of the invention. Abstraction 600 is merely an illustrative embodiment of a structural abstraction for representing the structure of a document, and is not intended to limit the scope of the invention. Other abstractions, for example, variations of abstraction 600 may be used, and are intended to fall within scope of the invention. For example, although abstraction 600 is formatted in accordance with XML (e.g., as an XML schema), any of a variety of other technologies may be used such as, for example, an object-oriented technology.

Abstraction 600 may include any of: content identifier field 602; one or more content fields 604; one or more nodes 606 and 608; other elements; or any suitable combination of the foregoing. Content ID field 602 may hold a value specifying an identifier of the content being represented by abstract 600. For example, in FIG. 6, where the content is a screen of customer information, field 602 may specify a screen ID value ("26").

The one or more context fields may provide context regarding the content. For example, field 604 may specify a topic of the screen 501 (e.g., "Customer Information").

Each node of abstraction 600 may correspond to a section of content 501. For example, node 606 may represent section 502 of screen 501. Node 606 may include section ID field 610 specifying an identifier of section 502, and section value field 612 specifying a value (i.e., the content) of section 502. Node 608 may include section ID field 614 specifying an identifier of section 504, and section value field 616 specifying a value of section 504.

As will be described in more detail below, abstraction 600, and in particular nodes thereof, may be used to generate references to information elements 248 of system 200, as will now be described.

Returning to FIG. 2, system 200 may include a reference generator 232 to generate one or more references 237 to one or more information elements 248. Reference generator 232 may be configured to generate structural abstraction information 233 from structural abstraction 218 and/or one or more nodes thereof. Generator 232 may be configured to use information 223 to access one or more entries of a mapping table 244, and to extract a transform 235 from which one or more references 237 may be generated.

Digressing briefly again from FIG. 2, FIG. 7 is a block diagram illustrating an example of a mapping table 700 for mapping content of an application to a reference specifying one or more information elements, in accordance with some embodiments of the invention. Mapping table 700 is merely an illustrative embodiment of a mapping table, and is not intended to limit the scope of the invention. Any of numerous other implementations of such a table, for example, variations of table 700 are possible and are intended to fall within the scope of the invention.

Table 700 may include a plurality of rows, including rows 702, 704, 706, 708 and 710, each row representing content of a particular type of software application. Table 700 may include one or more columns 712 for specifying an identification of the content for each entry, and may include one or more columns 718 for specifying a reference transform for the content specified in column 712.

For example, in FIG. 7, table 700 includes two columns 714 and 716 that specify, respectively, an application and screen identifier of the content of each entry. As should be appreciated, the content represented by an entry may be specified in any of a variety of ways, and is not limited to specifying an application and screen identifier as in the illustrative example of mapping table 700.

For example, entry 702 specifies a type of application of "PeopleSoft", a screen I.D. of "5" and a transform formatted in accordance with the Extensible Style Sheet Language Transformation (XSLT) language for transforming XML objects (e.g., documents) into other XML objects. It should be appreciated that any of a variety of types of transforms may be specified in column 718 of each entry, and the invention is not limited to specifying XSLT transformations. The reference transform may specify one or more transforms, while each transform may correspond to a particular node (e.g., node 220) of a structural abstraction (e.g., abstraction 218). As described above each node may correspond to a particular section (e.g., section 216) of the content. Accordingly, a reference transform may include transforms corresponding to one or more sections of content (e.g., field 106 of user interface display 100).

In some embodiments, table may be configured differently than as shown in FIG. 7. For example, as opposed to having one entry per body of content, table 700 may have one entry per section of a body of content. For example, each entry of table 700 may correspond to a particular node of a software abstraction and/or a particular section of content. In such embodiments, the reference transform of column 718 may apply to only one abstraction node or content section. Any other of a variety of other configurations are possible and are intended to follow from the scope of the invention.

Returning to FIG. 2, reference generator 232 may receive the reference transform 235 from mapping table 244, and may generate a reference 237, which generator 232 may send to information exchange controller 236. In an embodiment of the invention implemented using IBF, reference generator 232 may be implemented as part of Information Bridge Engine 336 of system 300, for example, as described on the IBF website and/or in Appendix I. Further, reference generator 232 may be implemented by Information Bridge Engine 336 exchanging communications with mapping service 345, which may be configured to abstract reference transforms 235 from mapping information 344.

Similarly, URL recognizer 230 may be configured to interpret URL 210 and produce reference 231, which may be sent to information exchange controller 236. URL recognizer may be implemented as part of a Information Bridge Engine 336 of system 300.

Further, smart tag recognizer 228 may be configured to interpret a smart tag (e.g., smart tag 206) associated with content and generate reference 229, which may be sent to information exchange controller 236. Smart tag recognizer 228 may be using Information Bridge Engine 336.

Further, any of smart tag recognizer 228, URL recognizer 230 and reference generator 232 may be implemented, at least in part, by an application-specific referencing module 327 of system 300. Module 327 may be implemented as part of host application 326. For example, module 327 (and/or any of components 228, 230 and 232) may be coded from scratch to generate references to information elements. Further, any of these components may be implemented using extensibility provided by host application 226 and/or 326, or a standard version of a host application may be configured to implement any one or more of these components.

Information exchange controller 236 may be configured to receive a reference (e.g., any of references 229, 231 or 237) and use this reference 241 to retrieve one or more information elements 243 from data source 246. Controller 236 may be configured to use these information elements 243 to pass pieces of information 139 to a user interface module 234, through which these pieces of information may be displayed to a user. In embodiments of the invention implements using IBF, module 234 may be implemented as part of Application Integration and Rendering Module 324 of system 300, for example, as described on the IBF website and/or in Appendix I.

User interface module 234 may be configured to enable a user to make modifications 245 to one or more pieces of information 139, and these modifications may be sent to information exchange controller 236. Controller 236 then may communicate with one or more application services (e.g., services 238 and 240) to request or make such modifications to the corresponding information of information base 252. As described above, the information in information base 252 is the information that is exposed for access by other types of applications by information elements 248. In embodiments of the invention implemented using IBF, information exchange controller 236 may be implemented as part of Information Bridge Engine 336 of system 300, for example, as described on the IBF website and/or in Appendix I. Further, any of the application services (e.g., services 238 and 240) used to request or make changes to information and information database 252 may be implemented using any of web services 358, 360 and 362, for example, as described on the IBF website and/or in Appendix I.

Systems 200 and 300, and components thereof, may be implemented using any of a variety of technologies, including software (e.g., C, C#, C++, Java, or a combination thereof), hardware (e.g., one or more application-specific integrated circuits), firmware (e.g., electrically-programmed memory) or any combination thereof. One or more of the components of systems 200 and 300 may reside on a single device (e.g., a computer), or one or more components may reside on separate, discrete devices. Further, each component may be distributed across multiple devices, and one or more of the devices may be interconnected.

Further, on each of the one or more devices that include one or more components of systems 200 and 300, each of the components may reside in one or more locations on the system. For example, different portions of the components of these systems may reside in different areas of memory (e.g., RAM, ROM, disk, etc.) on the device. Each of such one or more devices may include, among other components, a plurality of known components such as one or more processors, a memory system, a disk storage system, one or more network interfaces, and one or more busses or other internal communication links interconnecting the various components. Systems 200 and 300, and components thereof, may be implemented using a computer system such as that described below in relation to FIGS. 9 and 10.

Figure 8:
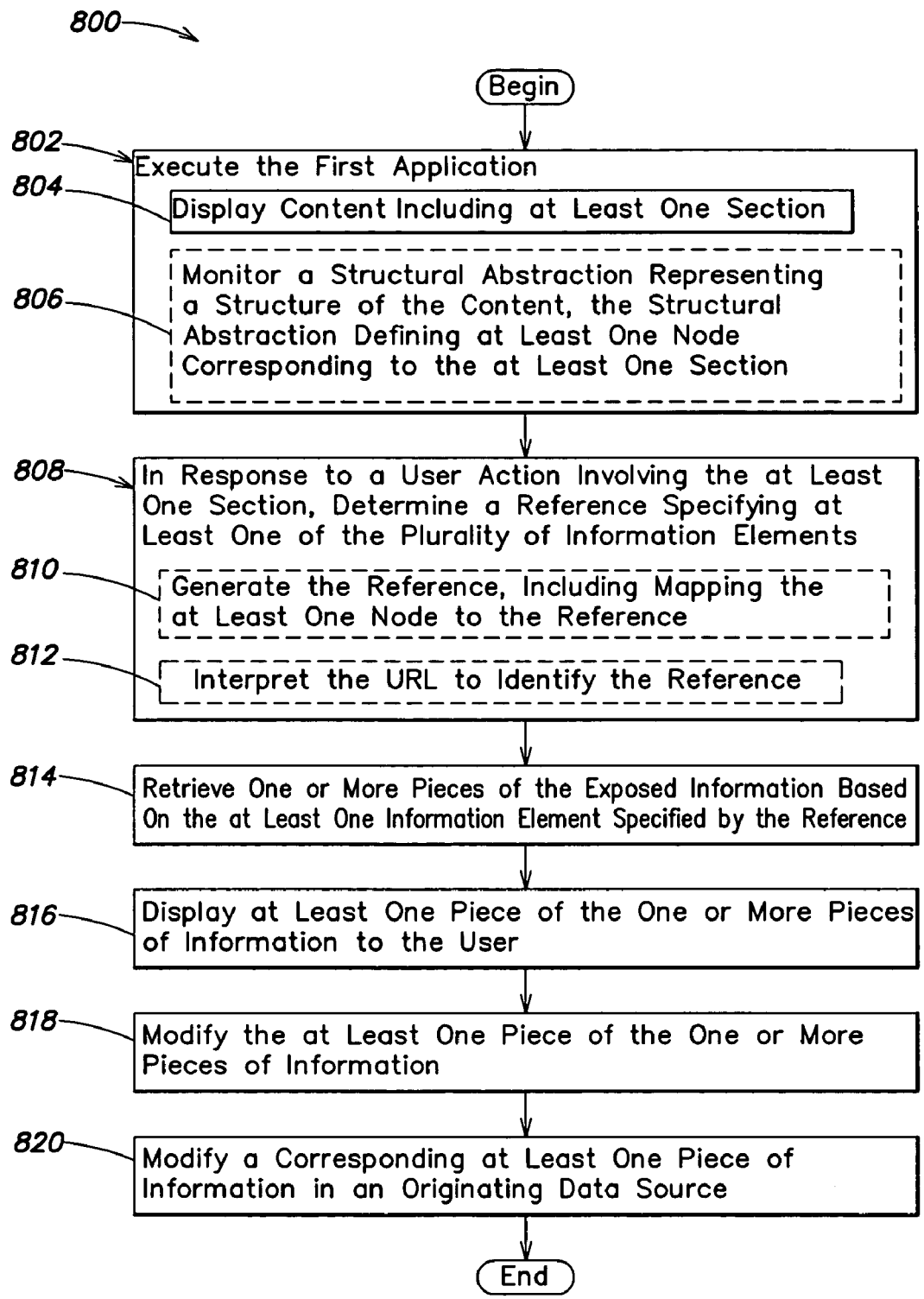
FIG. 8 is a flow chart illustrating an example of a method of providing access, from within a first type of software application, to information configured for use by a second type of application, according to some embodiments of the invention.

FIG. 8 is a flow chart illustrating an example of a method 800 of providing access, from within a first type of software application, to information configured for use by a second type of application, according to some embodiments of the invention. Method 800 is merely an illustrative embodiment of a method of providing access, from within a first type of software application, to information configured for use by a second type of application, and is not intended to limit the scope of the invention. Any of numerous other implementations of such a method, for example, variations of method 800, are possible and are intended to fall within the scope of the invention. Method 800 and acts thereof may be implemented using any of systems 200, 300, or a part thereof, or any suitable combination of the foregoing.

A plurality of information elements (e.g., information elements 248) may be stored in one or more data sources (e.g., data source 246). These information elements may expose information configured for use by the second type of application (e.g., information of information base 252) for use by applications of at least the first type (e.g., applications of the type of post application 226).

In Act 802, the first application may be executed. Executing the first application may include displaying, in Act 804, content (e.g., content 202) to a user, the content including at least one section. In some embodiments, one or more of the at least one section (e.g., section 204) may have an associated smart tag (e.g., smart tag 206) including a reference (e.g., 208) to one or more information elements. Further, one or more of the at least one section (e.g., section 210) may include a URL (e.g., URL 212) specifying a reference (e.g., reference 212) to one or more information elements.

In some embodiments, Act 802 may include an Act 806 of monitoring a structural abstraction (e.g., abstraction 218) representing a structure of the displayed content. The structural abstraction may define at least one node (e.g., any of the nodes 220, 222 and 224) corresponding to the at least one section of the content (e.g., any of sections 204, 210 or 216).

In Act 808, in response to a user action (any of those described herein) involving the at least one section, a reference specifying at least one of the plurality of information elements may be determined. In some embodiments, if a structural abstraction representing a structure of the content is provided, Act 808 may include an Act 810 of generating the reference, which may include mapping the at least one node of the abstraction to the reference. For example, generating a reference may be performed as described above in relation to FIGS. 2-6 herein.

In some embodiments, where the at least one section of the content has an associated URL, Act 808 may include an Act 812 of interpreting the URL to identify the reference, for example, as described above in relation to URL recognizer 230 of system 200. Further, if the at least one section of the content has an associated smart tag, Act 808 may include an act of interpreting the smart tag to identify the reference, for example, as described above in relation to smart tag recognizer 228 of system 200.

In Act 814, one or more pieces of the exposed information may be retrieved based on the at least one information element specified by the reference, for example, as described above in relation to information exchange controller 236 of system 200. In Act 816, at least one of the one or more pieces of retrieved information may be displayed to a user, for example, as described above in relation to user interface module 224 of system 200.

In Act 818, the at least one piece of the one or more pieces of information may be modified by a user, for example, as described above in relation to user interface module 224. In response, in Act 820, a corresponding at least one piece of information may be modified in an originating data source. For example, as described above in relation to system 200, one or more pieces of information from information base 252 may be modified in accordance with one or more modifications 245 specified by a user.

Method 800 may include additional acts. Further, the order of the acts performed as part of method 800 is not limited to the order illustrated in FIG. 8, as the acts may be performed in other orders and/or one or more of the acts may be performed in series or in parallel, at least partially.

Method 800, acts thereof and various embodiments and variations of this method and these acts, individually or in combination, may be defined by computer-readable signals tangibly embodied on or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein (e.g., method 800 or any acts thereof), and/or various embodiments, variations and combinations thereof. Such instructions may be written in any of a plurality of programming languages, for example, Java, J#, Visual Basic, C, C#, or C++, Fortran, Pascal, Eiffel, Basic, COBOL, etc., or any of a variety of combinations thereof. The computer-readable media on which such instructions are embodied may reside on one or more of the components of any of systems 200, 300, 900 and 1000 described herein, may be distributed across one or more of such components, and may be in transition therebetween.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, for example, the computer system described in relation to FIGS. 2, 3, 9 and 10, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Various embodiments according to the invention may be implemented on one or more computer systems. These computer systems, may be, for example, general-purpose computers such as those based on Intel PENTIUM-type processor, Motorola PowerPC, Sun UltraSPARC, Hewlett-Packard PA-RISC processors, any of a variety of processors available from Advanced Micro Devices (AMD) or any other type of processor. It should be appreciated that one or more of any type of computer system may be used to implement various embodiments of the invention.

A general-purpose computer system according to one embodiment of the invention is configured to perform one or more of the functions described above. It should be appreciated that the system may perform other functions and the invention is not limited to having any particular function or set of functions.

Figure 9:
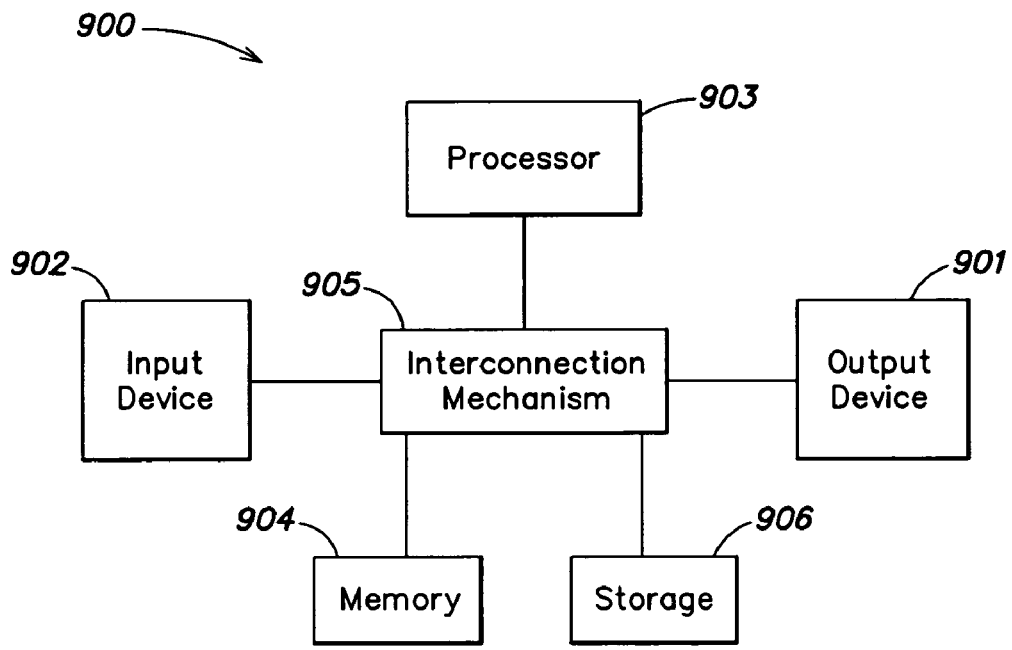
FIG. 9 is a block diagram illustrating an example of a computer system on which some embodiments of the invention may be implemented.

For example, various aspects of the invention may be implemented as specialized software executing in a general-purpose computer system 900 such as that shown in FIG. 9. The computer system 900 may include a processor 903 connected to one or more memory devices 904, such as a disk drive, memory, or other device for storing data. Memory 904 is typically used for storing programs and data during operation of the computer system 900. Components of computer system 900 may be coupled by an interconnection mechanism 905, which may include one or more busses (e.g., between components that are integrated within a same machine) and/or a network (e.g., between components that reside on separate discrete machines). The interconnection mechanism 905 enables communications (e.g., data, instructions) to be exchanged between system components of system 900. Computer system 900 also includes one or more input devices 902, for example, a keyboard, mouse, trackball, microphone, touch screen, and one or more output devices 901, for example, a printing device, display screen, speaker. In addition, computer system 900 may contain one or more interfaces (not shown) that connect computer system 900 to a communication network (in addition or as an alternative to the interconnection mechanism 905.

Figure 10:
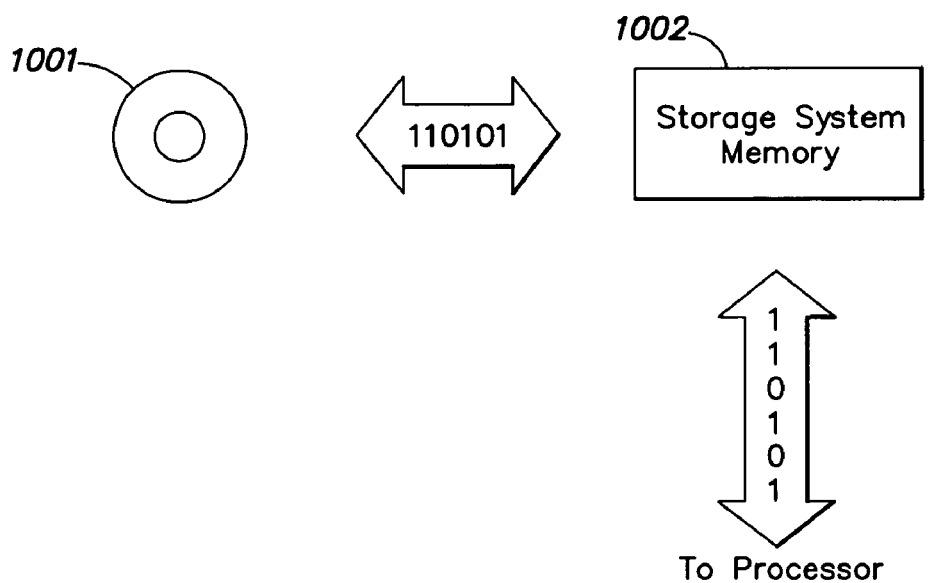
FIG. 10 is a block diagram illustrating an example of a storage system that may be used as part of the computer system to implement some embodiments of the invention.

The storage system 1006, shown in greater detail in FIG. 10, typically includes a computer readable and writeable nonvolatile recording medium 1001 in which signals are stored that define a program to be executed by the processor or information stored on or in the medium 1001 to be processed by the program. The medium may, for example, be a disk or flash memory. Typically, in operation, the processor causes data to be read from the nonvolatile recording medium 1001 into another memory 1002 that allows for faster access to the information by the processor than does the medium 1001. This memory 1002 is typically a volatile, random access memory such as a dynamic random access memory (DRAM) or static memory (SRAM). It may be located in storage system 1006, as shown, or in memory system 1004, not shown. The processor 1003 generally manipulates the data within the integrated circuit memory 1004, 1602 and then copies the data to the medium 1001 after processing is completed. A variety of mechanisms are known for managing data movement between the medium 1001 and the integrated circuit memory element 1004, 1002, and the invention is not limited thereto. The invention is not limited to a particular memory system 1004 or storage system 1006.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 1000 is shown by way of example as one type of computer system upon which various aspects of the invention may be practiced, it should be appreciated that aspects of the invention are not limited to being implemented on the computer system as shown in FIG. 9. Various aspects of the invention may be practiced on one or more computers having a different architecture or components that that shown in FIG. 9.

Computer system 1000 may be a general-purpose computer system that is programmable using a high-level computer programming language. Computer system 1000 also may be implemented using specially-programmed, special-purpose hardware. In computer system 1000, processor 1003 is typically a commercially available processor such as the well-known Pentium class processor available from the Intel Corporation. Many other processors are available. Such a processor usually executes an operating system which may be, for example, the Windows® 95, Windows® 98, Windows NT®, Windows® 2000 (Windows® ME) or Windows® XP operating systems available from the Microsoft Corporation, MAC OS System X available from Apple Computer, the Solaris Operating System available from Sun Microsystems, Linux available from various sources or UNIX available from various sources. Any of a variety of other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system, and that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems, and that the invention is not limited to any particular distributed architecture, network, or communication protocol.

Various embodiments of the present invention may be programmed using an object-oriented programming language, such as SmallTalk, Java, J# (J-Sharp), C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof. Further, various embodiments of the invention may be implemented using Microsoft®.NET technology available from Microsoft Corporation.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any equivalent means, known now or later developed, for performing the recited function.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of enabling a user to access, during and in response to execution of a first software application of a first type, information configured for use by a second type of software application different than the first type, wherein a plurality of information elements are stored in one or more data sources, the information elements exposing the information for use by applications of at least the first type, the method comprising acts of:
    (A) executing the first application, including displaying content having at least one section and monitoring a structural abstraction associated with the content, the structural abstraction representing a structure of the content and defining at least one node corresponding to the at least one section of the content;
    (B) in response to a user action involving the at least one section of the content, generating a reference specifying at least one of the plurality of information elements stored in the one or more data sources, wherein the generating includes mapping the at least one node of the structural abstraction to the reference;
    (C) retrieving one or more pieces of the information configured for use by the second type of software application based on the at least one information element specified by the reference, the information configured for use by the second type of software application being retrieved without execution of the software application of the second type, wherein the one or more data sources include an originating data source storing the information configured for use by the second type of software application, from which the plurality of information elements are derived;

(D) receiving, by the first application, a user modification of the at least one of the one or more pieces of the information configured for use by the second type of software application;

(E) in response to the user modification, the first application modifying a corresponding at least one piece of the information in the originating data source; and wherein the one or more data sources store at least one mapping table for mapping nodes of the structural abstractions to references specifying information elements, and wherein the act (B) includes applying the at least one mapping table to map the at least one node of the structural abstraction to the at least one information element.

2. The method of claim 1, further comprising an act of:
displaying to the user at least one of the one or more pieces of the information configured for use by the second type of software application.

3. The method of claim 1, wherein the plurality of information elements and the reference are defined in accordance with a version of Information Bridge Framework available from Microsoft Corporation.

4. The method of claim 1, wherein the first application is not part of a Microsoft® Office suite of applications.

5. The method of claim 1, wherein the act (B) includes generating the reference to include content of the at least one section and context information based on the at least one node.

6. A system for enabling a user to access, during and in response to execution of a first software application of a first type, information configured for use by a second type of software application different than the first type, wherein a plurality of information elements are stored in one or more data sources, the information elements exposing the information for use by applications of at least the first type, the system comprising:

A processor;

a computer-readable storage medium containing software components for execution by the processor, the software components including:

the first software application to display content including at least one section, and to monitor a structural abstraction associated with the content, the structural abstraction representing a structure of the content and defining at least one node corresponding to the at least one section of the content;

a reference generator to control, in response to a user action involving the at least one section of the content, generation of a reference specifying at least one of the plurality of information elements stored in the one or more data sources, the reference generator operative to map the at least one node of the structural abstraction to the reference;

an information exchange controller to control retrieval of one or more pieces of the information configured for use by the second type of software application based on the at least one information element specified by the reference, the information configured for use by the second type of software application being retrieved without execution of the software application of the second type;

a user interface module to control display to the user of at least one of the one or more pieces of the information configured for use by the second type of software application, wherein the one or more data sources include an originating data source storing the information configured for use by the second type of software application, from which the plurality of information elements are derived, wherein the user interface module is operative to enable the user to modify the at least one piece of the-information configured for use by the second type of software application, and wherein the information exchange engine is operative to at least initiate, in response to the user modification, a modification of a corresponding at least one piece of the information in the originating data source; and wherein the one or more data sources store at least one mapping table for mapping nodes of the structural abstractions to references specifying information elements, and wherein the reference generator is operative to control an applying of the at least one mapping table to map the at least one node of the structural abstraction to the at least one information element.

7. The system of claim 6, wherein the plurality of information elements and the reference are defined in accordance with a version of Information Bridge Framework available from Microsoft Corporation.

8. The system of claim 6, wherein the first application is not part of a Microsoft® Office suite of applications.

9. The system of claim 6, wherein the reference generator is operative to generate the reference to include content of the at least one section and context information based on the at least one node.

10. A method of enabling a user to access, during and in response to execution of a first software application of a first type, information configured for use by a second type of software application different than the first type, wherein a plurality of information elements are stored in one or more data sources, the information elements exposing the information for use by applications of at least the first type, the method comprising acts of:

(A) Executing the first application, including displaying content including at least one section having an associated uniform resource locator specifying a reference to at least one of the plurality of information elements;

(B) In response to a user action involving the at least one section of the content, interpreting the uniform resource locator to identify the reference;

(C) retrieving one or more pieces of the information configured for use by the second type of software application based on the at least one information element specified by the reference, the information configured for use by the second type of software application being retrieved without execution of the software application of the second type, wherein the one or more data sources include an originating data source storing the information configured for use by the second type of software application, from which the plurality of information elements are derived;

(D) receiving, by the first application, a user modification of the at least one piece of the information configured for use by the second type of software application;

(E) in response to the user modification, the first application modifying a corresponding at least one piece of the information in the originating data source; and wherein the one or more data sources store at least one mapping table for mapping nodes of the structural abstractions to references specifying information elements, and wherein the act (B) includes applying the at least one mapping table to map the at least one node of the structural abstraction to the at least one information element.

11. The method of claim 10, further comprising an act of: displaying to the user at least one of the one or more pieces of the information configured for use by the second type of software application.

12. The method of claim 10, wherein the plurality of information elements and the reference are defined in accordance with a version of Information Bridge Framework available from Microsoft Corporation.

13. The method of claim 10, wherein the first application is not part of a Microsoft® Office suite of applications.

14. The method of claim 10, wherein the act (B) includes generating the reference to include content of the at least one section and context information based on the at least one node.

* * * * *